Figure 1:
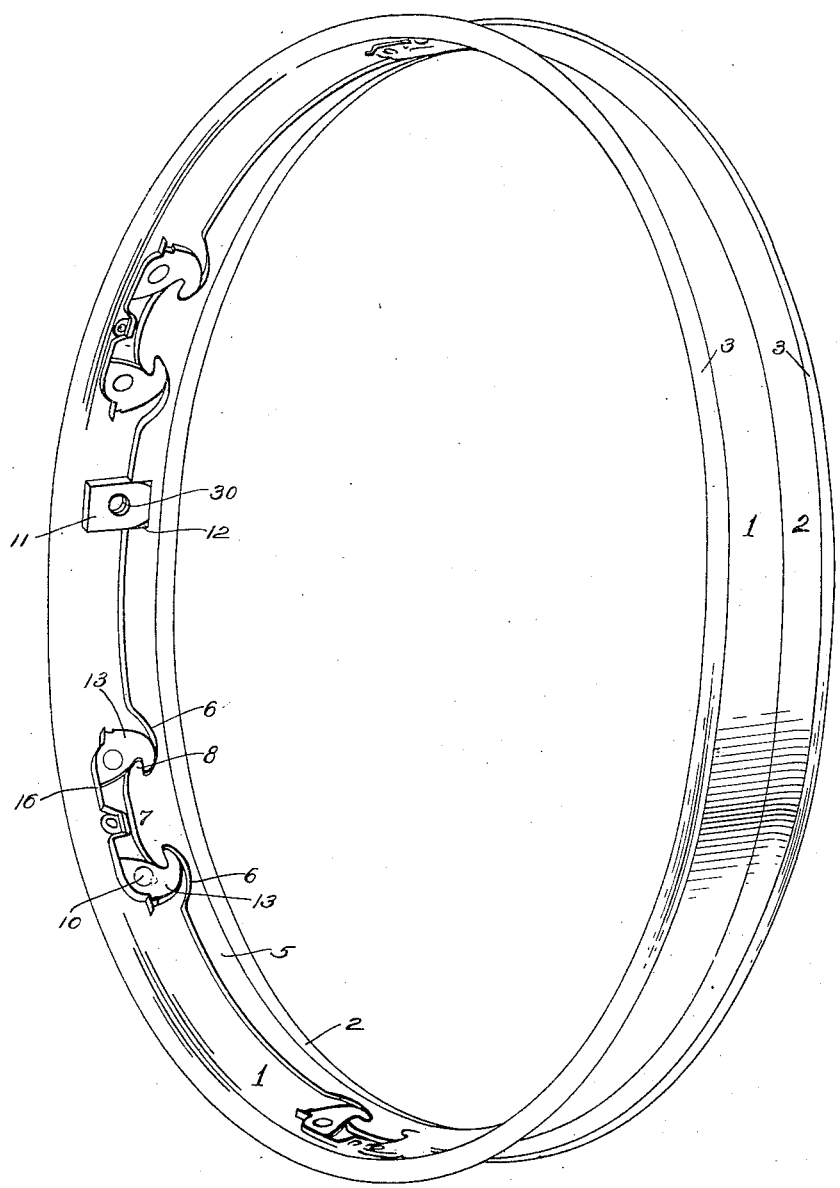

R. S. BRYANT.
RIM FOR VEHICLE WHEELS.
APPLICATION FILED APR. 25, 1912.

1,172,425.

Patented Feb. 22, 1916.
2 SHEETS—SHEET 1.

Witnesses:
Brennan B. West
Chas. O. Witt

Inventor
Richard S. Bryant
By Hull & Smith
Att'ys.

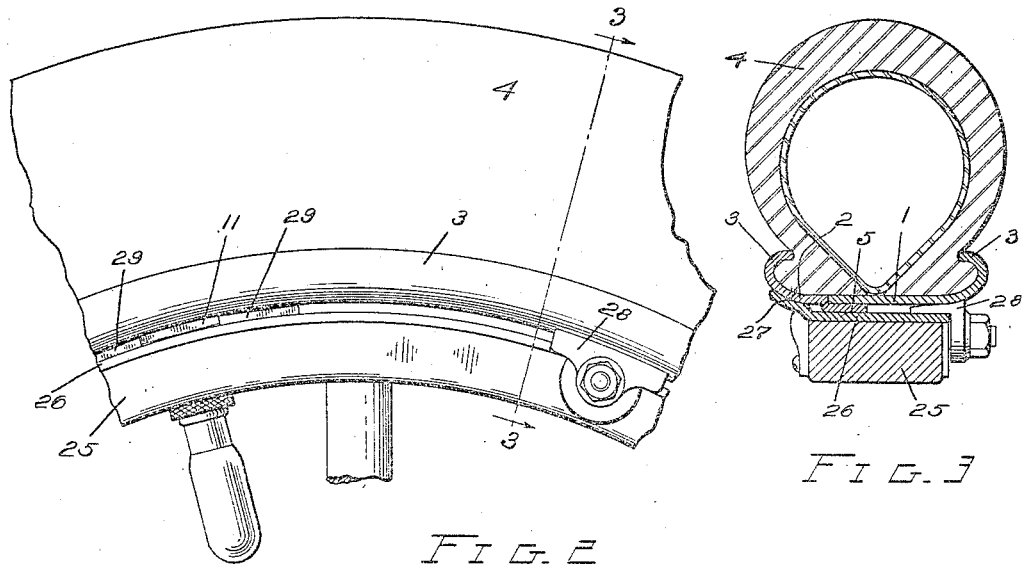
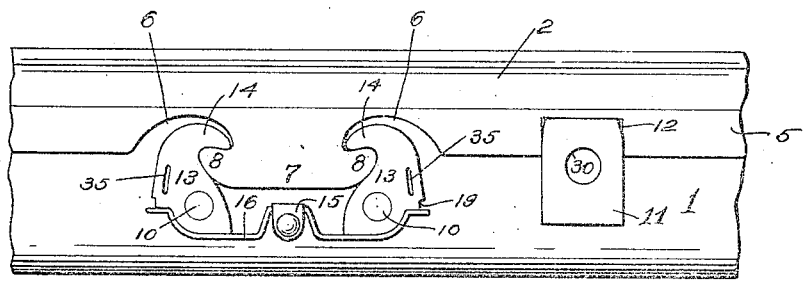
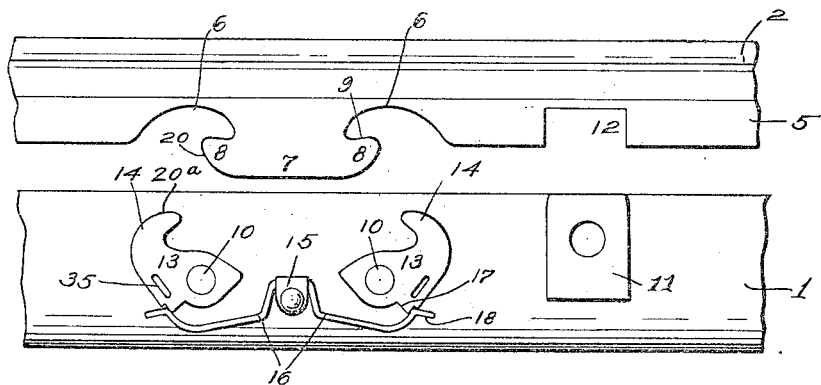

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

RIM FOR VEHICLE-WHEELS.

1,172,425.

Specification of Letters Patent.  Patented Feb. 22, 1916.

Application filed April 25, 1912. Serial No. 693,079.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to rims for vehicle wheels of the type designed to secure a pneumatic or other resilient tire in place thereon and permit the ready removal of the same therefrom for purposes of repair or replacement. According to the usual contemporary practice, such rims invariably take the form of a circular band embracing the wheel felly and provided with outwardly projecting lateral flanges adapted to engage the sides of the tire, these flanges having different shapes according to the particular type of tire with which they are to be used. The stiffness and rigidity of the tire renders its removal very difficult in case these rims and their flanges be made in one piece, since such construction necessitates that the tire be expanded so as to be pried over the flanges both upon removal and replacement. To obviate this difficulty, several expedients have been proposed chief among which are:— the contraction of the rim by the removal of a portion or the overlapping of the ends thereof, so as to avoid the necessity for stretching the tire; the formation of the rim proper of the complete width of the tire but with one of its side flanges detachable therefrom so that it can be readily removed and the tire drawn from the wheel with comparatively little opposition; and the formation of the rim in two parts which are detachably connected together at a point within the boundary of the tire. It is with the last expedient that the invention of the present application is concerned. It will be obvious that, in effect, the last of the three expedients is much like the second expedient in that in each case one of the flanges is removed, the point of detachment of the flange being in one instance outside of the line of the tire, but in the other case inside of the line of the tire. The effect upon the structure is, however, very different in the two cases, the methods of securing the parts together not only differing widely, but the latter construction necessitating the dismountable connection of the rim and felly while the former construction is operative even though the rim be permanently connected to the wheel.

The objects of the present invention are the provision of novel and simplified mechanism for the secure attachment of the two rim portions to each other; the provision of attaching means which may be readily disconnected when occasion shall arise without the necessity for the employment of any special tools other than those which the operator always possesses, and which shall be proof against accidental disconnection or against being rendered inoperative by rust, dirt, ice, or other foreign matter; the provision of a rim of this character in which no relative circular movement of the two parts shall be necessary to either the attachment or detachment of the parts; the provision of securing means which are permanently attached either to one or the other of the parts so that there shall be nothing which can by any possibility be lost or mislaid; the provision of attaching means which, while perfectly secure under all incidents of use, will offer the least possible obstruction to the disconnection of the parts; the provision of a device whereof all the parts are of great simplicity and uniformity so as to permit the cheap and rapid manufacture thereof; the provision of a device of extreme lightness, combined with strength and elegance; while further objects and advantages of the invention will become apparent in the course of the following description and claims.

Generally speaking, my invention may be defined as consisting of the combinations of elements recited in the claims hereto annexed and illustrated in the drawings accompanying and forming part hereof, wherein:—

Figure 1 represents a perspective view of a complete rim made in accordance with my invention; Fig. 2 is an elevational view of a portion of a wheel equipped with a rim of my invention, the usual pneumatic tire being shown in place thereon; Fig. 3 is a cross sectional view taken upon the broken line 3—3 of Fig. 2 and looking in the direction of the arrows; Fig. 4 represents an inside development of a portion of the rim showing the parts in connected position; and Fig. 5 represents a like development, the parts being illustrated in disconnected position.

Describing the parts by reference characters, 1 and 2 represent the two portions of a split or sectional rim, each of which consists of an annular band adapted to embrace a vehicle wheel. The outer edges of these portions are illustrated as provided with inturned flanges or clenches 3—3 adapted to engage the beads of a tire 4 in the usual manner, and one of the portions, as 2, is provided with an offset lip 5 adapted to overlie the adjacent edge of the other member so as to maintain the outer surfaces thereof substantially flush with each other.

For securing the two members of the rim together, I provide the lip 5 with a plurality of pairs of spaced notches 6—6, and between the notches of each pair I extend the lip forwardly so as to form a head 7, the sides of which project laterally over a portion of the adjacent notches as at 8—8, the rear sides of these projections preferably being slightly undercut as at 9 and constituting fixed hook members. The inner face of rim section 1 is provided with pairs of spaced studs 10—10 so arranged that each stud will fall substantially opposite the center of a notch 6 when the two rim sections are assembled. The member 1 is also preferably provided with a block 11 on its inner surface adapted to be received in a notch 12 formed in the lip 5 so as to assure the registering of the studs and notches. Pivoted upon each of the studs 10 is a member 13 having its forward end hooked as at 14 so as to enter the adjacent notch 6 and engage behind the projection or fixed hook member 8. Secured by a clip 15 midway between each pair of studs is a leaf spring 16, the ends whereof are shaped to engage the rearward ends of the adjacent hook members 13. The exact conformation of these springs and members can be varied in a number of ways, it being merely essential that the movable hooks or snaps be held yieldingly in inward position during the normal use of the rim, or be returned to such position after having been displaced therefrom within certain limits, and be also held against returning when displaced from normal position by a greater amount. To this end I have illustrated each of the members 13 as provided with a radial shoulder 17 adapted to be engaged by a similarly shaped portion 18 of the spring during the normal use of the device, the snap member being also formed with a shoulder 19 adapted to pass by a suitable point of the spring as shown in Fig. 5, when the snap member is moved a sufficient distance out of locking position so that it will be maintained in displaced position. The outer faces of the hooks 14 and projections 8 are inclined, beveled or rounded as at 20—20$^a$ so as to exert a camming action upon each other when the members are caused to approach each other. Each of the snap members may conveniently be formed with a slot 35 for the reception of the blade of a screwdriver or like tool.

It will be seen by reference to Figs. 4 and 5 that the distance between the studs 10—10 of each pair is substantially the same as that between the ends of the corresponding projections 8—8. The rearward sides of these projections being undercut the effect of any separating stress upon the members will cause them to be drawn yet more firmly together, while their occurrence in pairs will neutralize any tendency to rotate the halves of the rim with respect to each other. The position of the projections 8—8 slightly at the side of the studs 10—10 prevents the hooks from binding because of their under cut formation.

The rim may be secured to the wheel in any one of a great many ways, the particular expedient selected having no bearing upon the present invention. In Figs. 2 and 3 hereof I have illustrated a wheel having a felly 25 surrounded by a felly band 26, one edge whereof is turned outwardly to form a flaring flange 27 adapted to engage one side of the rim, while the other side of the felly band is left flat for the reception of wedge members 28 whereby the rim is secured in place as in the usual manner. The rim is thus spaced from the felly band by an amount sufficient for the reception of the snap members 13. Driving is most conveniently effected by locating the block 11 between driving lugs 29—29 secured to the outer face of the felly band, although a separate driving block from the block 11 could obviously be employed if desired. In this embodiment I have illustrated the block 11 as having an aperture 30 for the reception of the valve stem 31 in accordance with the usual practice.

In the operation of detaching the parts of the rim, a screw driver blade is inserted into the slot 35 of each of the snaps successively and the same rotated from the position shown in Fig. 4 to that shown in Fig. 5, after which the two sections of the rim can be separated by a direct pull and without any opposition excepting that due to the adhesion of the rubber to the metal. When the parts are to be reconnected, the snap members 13 are first returned to the position shown in Fig. 4, the tire positioned around the part 1 with its valve stem projecting through the aperture 30 in the usual manner, the one section superposed upon the other with the notch 12 registering with the block 11, and the parts pressed together, whereupon the snap members 13 will yield to permit the passage of the heads 7 and close behind the same automatically locking the sections securely together. This closing of the members 13 behind projections 8 is facilitated by the convex conformation of the ends of said members and the concave conformation of the notches 6, so that, even if the two rim sections be brought together with the members 13 in their separated condition, as shown in Fig. 5, they will still be automatically moved into locking position. The springs 16 serve equally, whichever mode of assembly be adopted, to maintain said members 13 in engagement with the projections 8. The length of the heads 7 is preferably such as to cause the two sections of the rim to be centered with respect to each other prior to the engagement of the tire beads by the clenches 3. The assembled rim is mounted upon the felly in a positive manner, and it will be seen that the method of securing the rim will prevent the disconnection of the rim sections from each other even though some or all of the snap members should become disconnected or break.

While I have illustrated my improved rim as formed with inturned flanges or clenches at the sides for use with a tire of that particular kind, I have done so merely because of the wide use of this particular tire and because this construction exhibits in the fullest degree the advantages of my construction. At the same time it is obvious that all the benefits of my device would be realizable with any other shape of rim flanges. It is also obvious that many changes in shape, size, proportion, arrangement and operation of parts could be made without departing from my inventive idea or sacrificing any of the advantages of my construction and that I consider all such modifications to fall within the scope of my invention.

Having thus described my invention, what I claim is:

1. The combination of a pair of complementary annuli each provided at its outer edge with tire engaging means; inter-engaging means on said annuli, respectively, adapted to secure the same together, said means being automatically operable to effect such engagement upon said annuli being brought together; and means adapted to retain said inter-engaging means inoperative when desired.

2. The combination of a pair of complementary annuli each provided at its outer edge with tire engaging means; inter-engaging means carried by said annuli whereby the outer surfaces of the same are maintained substantially flush with each other; hook members pivotally attached to the inner face of one annulus and adapted to engage the other annulus; and springs engaging said hook members and adapted to maintain the same in such engagement.

3. The combination of a pair of complementary annuli each provided at its outer edge with a flange adapted to engage the side of a tire; inter-engaging means carried by said annuli whereby the outer surfaces of the same are maintained substantially flush with each other; inter-engaging means carried by said annuli for determining the relative circular position thereof; hook members pivotally attached to the inner face of one annulus and adapted to engage the other annulus; and springs engaging said hook member and adapted to maintain the same in such engagement.

4. The combination of a pair of complementary annuli each provided at its outer edge with a flange adapted to engage the side of a tire; inter-engaging means carried by said annuli whereby the outer surfaces of the same are maintained substantially flush with each other; inter-engaging means carried by said annuli for determining the relative circular position thereof; hook members pivotally attached to the inner face of one annulus and adapted to engage the other annulus; and springs engaging said hook members and adapted to maintain the same either in or out of engagement with said other annulus.

5. The combination of a pair of complementary annuli each provided at its outer edge with a flange adapted to engage the side of a tire; inter-engaging means carried by the inner edges of said annuli whereby the outer surfaces of the same are maintained substantially flush with each other, inter-engaging means carried by said annuli for determining the relative circular position thereof; hook members pivotally attached to the inner face of one annulus and adapted to engage the other annulus, said members having flattened portions and shoulders adjacent to said flattened portions; and springs engaging said flattened portions whereby said hook members are maintained in engagement with said other annulus, said shoulders serving to hold said hook members out of such engagement when the same are turned so as to move the shoulders past the springs.

6. The combination of a pair of complementary annuli each provided at its outer edge with a flange adapted to engage the side of a tire; inter-engaging means carried by said annuli adapted to maintain the outer surfaces of the same substantially flush with each other; rigid hook members carried by one annulus; and movable hook members carried by the other annulus and adapted to interlock with said rigid members, said rigid and movable members having coöperating portions adapted to force said movable members aside during the approaching movement of the parts.

7. The combination of a pair of complementary annuli each provided at its outer edge with a flange adapted to engage the side of a tire; inter-engaging means carried by said annuli adapted to maintain the outer surfaces of the same substantially flush with each other; rigid hook members carried by one annulus; movable hook members carried by the other annulus and adapted to interlock with said rigid members; and means on said first-named annulus adapted to force said movable members into engagement with said fixed members during the approaching movement of the parts.

8. The combination of a pair of complementary annuli each provided at its outer edge with a flange adapted to engage the side of a tire; inter-engaging means carried by said annuli adapted to maintain the outer surfaces of the same substantially flush with each other; rigid hook members carried by one annulus; movable hook members carried by the other annulus and adapted to interlock with said rigid members, said rigid and movable members having coöperating portions adapted to force said movable members aside during the approaching movement of the parts; and other means on said first-named annulus adapted to force said movable members into engagement with said fixed members during such movement.

9. The combination of a pair of complementary annuli each provided at its outer edge with a flange adapted to engage the side of a tire; inter-engaging means carried by the inner edges of said annuli whereby the outer surfaces of the same are maintained substantially flush with each other; inter-engaging means carried by said annuli for determining the relative circular position thereof; rigid hook members carried by one annulus and having inclined forward portions; movable hook members carried by the other annulus and adapted to interlock with said rigid members, said movable members also having inclined forward portions adapted to engage the first-named inclined portions to force said movable members aside during the approaching movement of the parts; and yielding means adapted to maintain said movable members either in or out of engagement with said fixed members.

10. The combination of a pair of complementary annuli each provided at its outer edge with a flange adapted to engage the side of a tire; rigid members carried by the inner edge of one annulus, whereby the outer surfaces of the same are maintained substantially flush with each other, said rigid members being formed with laterally projecting hook portions; and movable hook members pivoted upon radial axes adjacent to the inner surface of the other annulus and adapted to engage the former hook members, whereby the annuli are detachably secured together.

11. The combination of a pair of complementary annuli each provided at its outer edge with a flange adapted to engage the side of a tire; a flange carried by the inner edge of one annulus and adapted to overlap the inner face of the other annulus whereby the outer surfaces of the annuli are maintained substantially flush with each other, the edge of said flange being formed with spaced notches and with projections partially overhanging said notches; and hook members pivoted upon radial axes adjacent to the inner surface of the other annulus and adapted to engage said projections, whereby said annuli are detachably secured together.

12. The combination of a pair of complementary annuli each provided at its outer edge with a flange adapted to engage the side of a tire; a flange carried by the inner edge of one annulus and adapted to overlap the inner face of the other annulus whereby the outer surfaces of the annuli are maintained substantially flush with each other, the edge of said flange being formed with projections; pivoted hook members carried by the other annulus and adapted to engage said projections whereby said annuli are detachably secured together; and means carried by the last named annulus and interlocking with said flange whereby relative rotational displacement of said annuli is prevented.

13. The combination of a pair of complementary annuli each provided with a flange at its outer edge adapted to engage the side of a tire; a flange carried by the inner edge of one of said annuli adapted to overlap the inner edge of the other annulus whereby the outer surfaces of the same are maintained substantially flush with each other, said flange having a notch therein and the other annulus having a fixed block adapted to enter said notch; rigid hook members on said flange; and yielding hook members carried by the other annulus and adapted to engage said rigid hook members, whereby the annuli are detachably secured together.

14. The combination of a pair of complementary annuli each provided at its outer edge with a flange adapted to engage the side of a tire; interengaging means carried by the annuli for determining the relative circular position thereof; spaced rigid members carried by the inner edge of one annulus and overlapping the inner surface of the other annulus; said projections having lateral extensions forming rigid hooks, the inner sides whereof are undercut; spaced pairs of radial studs carried by the other annulus and corresponding in location to said hooks, the distance between the studs of each pair being substantially equal to the width of the corresponding projection; hook members pivoted upon said studs and having laterally turned undercut hooked ends, complementary to said rigid hooks; and springs carried by said annulus and engaging said pivotal hook members for automatically forcing the same into engagement with said rigid hooks when the annuli are assembled together.

15. The combination of a pair of complementary annuli each provided at its outer edge with tire-engaging means; a plurality of pairs of oppositely facing hook members pivotally attached to the inner face of one of said annuli; and means carried by the other annulus for engagement by said hook members, whereby the annuli are detachably secured together.

16. The combination of a pair of complementary annuli each provided at its outer edge with tire-engaging means; interengaging means carried by said annuli adapted to maintain the same in proper relative position; pairs of oppositely facing rigid hook members carried by one annulus; and corresponding pairs of movable hook members carried by the other annulus and adapted to interlock with said rigid members.

17. The combination of a pair of complementary annuli each provided at its outer edge with tire-engaging means: interengaging means carried by said annuli adapted to maintain the same in proper relative position; pairs of oppositely facing rigid hook members carried by one annulus; corresponding pairs of movable hook members carried by the other annulus and adapted to interlock with said rigid members; and springs respectively engaging each pair of said movable hook members and adapted to maintain the same in engagement with the adjacent pair of said fixed hook members.

18. In a device of the character described, in combination, a pair of complementary annuli adapted when secured together to form a vehicle rim, each of said annuli having at its outer edge an inwardly-turned flange, rigid members carried by the outer edge of one annulus and adapted to overlie the surface of the other annulus, whereby the outer surfaces of the same are maintained substantially flush with each other, said rigid members having undercut shoulders, and movable hook-members secured to the other of said annuli and adapted to engage said shoulders, whereby the annuli are detachably secured together.

In testimony whereof, I hereunto affix my signature in the presence of two witnesses.

RICHARD S. BRYANT.

Witnesses:
 HAROLD E. SMITH,
 J. B. HULL.